Dec. 1, 1936.    J. Y. BLAZEK ET AL    2,062,494
CLAMPING MEANS
Filed Dec. 21, 1933

INVENTORS
J. Y. Blazek
and
R. G. Anderson
By C. F. Heinkel ATTORNEY.

Patented Dec. 1, 1936

2,062,494

UNITED STATES PATENT OFFICE 2,062,494

CLAMPING MEANS

John Y. Blazek, Maple Heights, and Russell G. Anderson, Cleveland, Ohio, assignors to Lempco Products, Inc., Bedford, Ohio Application December 21, 1933, Serial No. 703,494

1 Claim. (Cl. 77—2)

The present invention relates to improvements in means and methods for clamping elements together.

Objects of the present invention are to provide a clamping means whereby elements can be clamped together; whereby the clamping can be released at will; wherein the clamping and the releasing is effected easily and conveniently; wherein the operating end of the clamping operating mechanism is located outwardly of the clamping means and of the elements when the same are clamped together or are ready to be clamped together; wherein the clamping is done by compensatingly moving members; which is efficient in action; and which is simple of structure.

Other objects will be specifically mentioned in this specification or will be pointed out or suggested therein, or will become obvious or apparent upon an inspection of this specification.

The present invention is illustratively, but not restrictively, shown in the accompanying drawing in which.

Similar reference characters refer to similar parts throughout the views.

Figure 1:
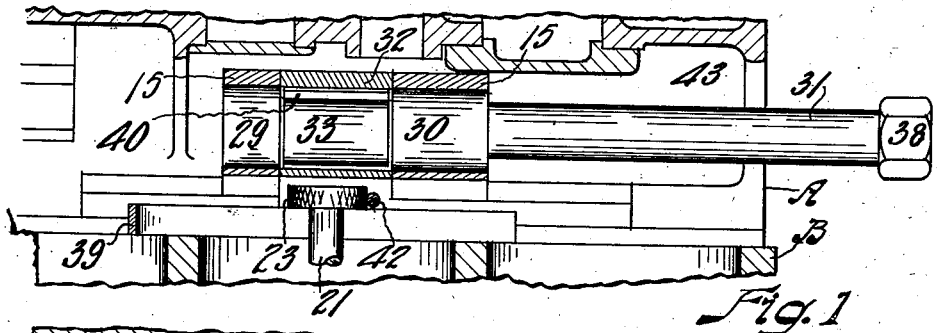
Fig. 1 is a sectional view of a clamping means, embodying the present invention, the section being taken on the line 1—1 of Fig. 2, and shows the bottom part of a cylinder boring device and a cylinder as being clamped together by the clamping means.

A cylinder boring device, represented in the drawing by the bottom portion A thereof, is shown as being clamped onto the cylinder B to releasably hold the boring device onto the cylinder for and during boring thereof.

The clamping member 10 has the shoulder 11 entering the bore in the cylinder, centralizingly or otherwise, and also has the shoulder 13 to abut the lower end face 14 of the cylinder B.

The clamping member 15, further described below, has the sides 16 to engage the faces 17 and 18, respectively, of the boring device A to releasably clamp the device A onto the cylinder B.

The forked, clevis-like member 19, a part of the connection between the clamping members, straddles a portion of the clamping member 10 and the pivot pin 20 extends through the clevis and through the mentioned portion of the clamping member 10 to hold these two members together and to form a swivel joint between the same so that one can swivel relative to the other.

For convenience of operation during installation of the boring device onto the cylinder, it is advantageous that the clamping member 10 be made rectangular in plan so that the same can be swiveled on the pivot pin 20 sufficient to allow the member 10 to pass through the cylinder from the top down for such installation.

The clamping rod 21, a part of the connection between the clamping members, has the lower end 22 thereof threaded into the clevis 19 and the upper end thereof terminates in the head 23 which is related to other elements described below.

The diametrically enlarged part 24 of the rod 21 forms a journal for the body 25 of the centralizing means for the clamping rod 21 so that the centralizing means can be rotated relative to the clamping rod when desired.

The flanges 26 and 27 abut the respective ends of the body 25 to confine the same to its bearing or journal. The body 25, is, of course, made sectional in any conventional or desired manner, not specifically shown in the drawing, so that the same can be installed on its bearing or journal. As an instance of installing the body 25 on its journal, the flange 27 may be threaded onto the rod 21 as shown and thereby not only retain the body 25 in proper position on its bearing but also provides an endwise adjusting means for the body to take up wear and to adjust the friction between the body and the flanges to regulate the easiness and uneasiness of rotating the body on its journal as desired or as occasion may demand. This frictional adjustment can even be carried far enough to retain the body from rotating on its journal. This structure, of course, requires no sectional body.

The rod centralizing screws 28, three in the present instance, are tapped into the body 25 to be screwed inwardly and outwardly thereof to locate the rod 21 relative of the cylinder bore by manipulating the screws so that the ends of the heads thereof abut the wall of the cylinder and thereby push the rod accordingly.

Figure 2:
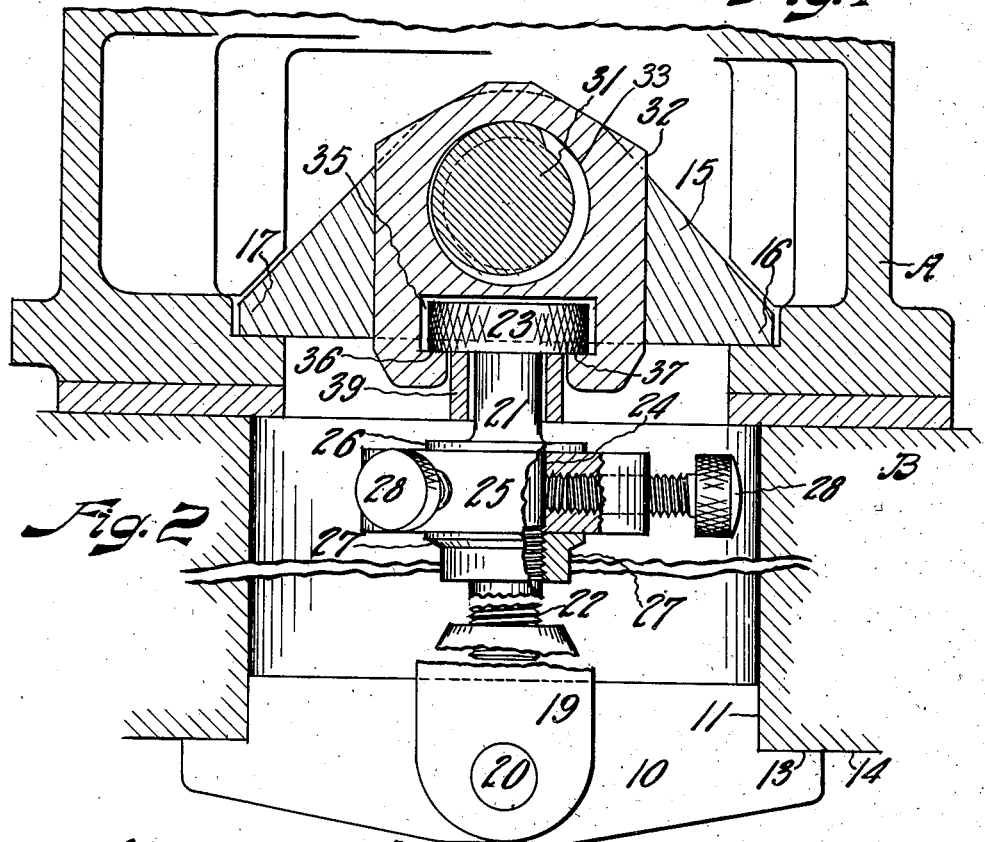
Fig. 2 is a transverse section, on a larger scale, taken on the line 2—2 of Fig. 1.

The clamping member 15 is rectangular in plan and the top faces thereof are inclined as shown in Fig. 2. The parts 29 and 30 of the clamping operating shaft 31 are journaled in the clamping member 15 as is seen in Fig. 1.

The member or head 32, a part of the connecting mechanism between the clamping members, is mounted in the member 15 to move axially therein, in the present instance to move vertically relative thereto, and has the bore 33 there-through transversely to the axis on which the member 32 moves.

The cam or eccentric part 34, in this instance integral with the shaft, operates in the bore 33 and moves the member 32 axially in the member 15 when the shaft 34 is moved rotatively.

The slot 35 extends through the member 32 near the bottom thereof and the axis thereof is parallel with the axis of the shaft 34 and is continued through both ends of the clamping member 15.

The previously mentioned head 23 can slide or move in the slot 35 and the bottom thereof contacts the shoulders 36 and 37 for clamping to provide a joint in the connection whereby the member 32 and the rod 28 are held together axially but have sidewise movement one relative to the other.

The shaft 31 is located horizontally and extends beyond the clamping and boring means and has the hexagonal part 38 on the outer end thereof for application thereto of a wrench or the like for rotative movement of the shaft. This outward extending of the shaft renders the operation of the clamping means quite convenient and easily available at all times.

The U-shaped member 39 is introduced between the top of the cylinder B and bridges the top of the bore therein as is seen in Fig. 1 and the bottom of the head 23 as is seen in Fig. 2.

Figure 3:
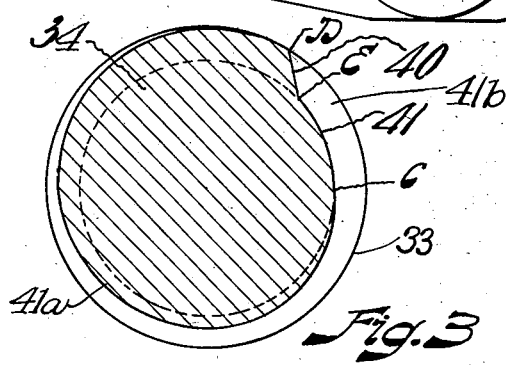
Fig. 3 is a section of the cam on a larger scale.

A preferred form of cam which has been found to give very good results for clamping and releasing is shown in Fig. 3, in this instance the diametrically lowest place of the cam surface is at C while the highest place thereof is at D which is 300 degrees from the point C. The contour of the cam surface 41 between the points C and E is concentric with the axis of the cam and the contour of the remaining cam surface 41a between the points C and D is eccentric therewith. It is, of course, obvious that deviation from this exact 300 degree spacing, one way or the other, will not materially alter the action of the cam. It is preferred, however, that the cam face be terminated at least approximately as shown by the line 40 (Fig. 3) to provide the recess 41b so that the clamping mechanism can find adequate space for release thereof.

The pin 42 is mounted in the head 32 in such a location that the same abuts the head 23 to arrest movement of the upper mechanism of the clamping means when the same is moved into the element A sidewise through the opening 43 therein.

As to operation of the device shown and described:

The rod 21 is first introduced into the bore in the cylinder A. The U-shaped member 39 is then placed between the top of the cylinder and the bottom of the head 21 to hold this part of the connection against dropping down therein and also to locate the head 21 in proper relation above the top of the cylinder for the slot 35 to meet the head 21 when the element A is placed onto the cylinder or element B.

The screws 28 are then rotated to abut the outer ends thereof on the wall of the cylinder bore. Rotation of the body 25 will show whether the rod 21 is central by each of the ends of the screws 28 being in the same contact with the cylinder wall or spaced the same distance therefrom. The rod 21 and the mechanism thereof is central with the cylinder bore when all of the screws 28 have the same distance relation to the wall of the cylinder bore when the body 25 is rotated on the rod 21 and the clamping means is thereby centralized relative to the cylinder bore.

The lower clamping member 10, being pivoted relative to the rod, can conveniently be pivoted so that the same passes through the cylinder bore while the lower part of the clamping means is inserted through the cylinder from the top thereof.

The clamping member 10 is rotated to bring the surfaces 13 against the surface 14 on the bottom of the cylinder by means of the threaded together parts in the connection and thereby adjust the clamping member 10 relative to the bottom of the cylinder and the clamping means.

The boring device A is then placed onto the top of the cylinder.

The upper part of the clamping means, composed of the shaft 31 and the parts or members 15 (upper clamping member) and the cam operated part or member 32 thereon, is then inserted into the element A through the opening 43 in the side thereof and is moved, transversely of the cylinder bore, until the slot 35 finds the head 23 and the pin 42 contacts the now centralized head 23 whereupon the upper part of the clamping means is centralized relative to the rod 21 and to the wall of the cylinder bore.

When desired, the clamping member 15 and the operable member 32 may be placed over the head 23 either before or after the element A is placed onto the element B and the shaft and cam thereon can then be individually inserted into the members 15 and 32. The stop pin 42 will locate the members and limit the distance of inserting the shaft into the device so that the cam on the shaft will be located in correct relation to the member 32.

A rotative movement of the shaft 31 rotates the cam 34 which then operates the member 32 to move axially in the clamping member 15 and by that axial movement also moves the thereto connected rod 21 axially and thereby moves the clamping plate 10 against the face at the bottom of the cylinder. The journal parts 29 and 30 of the shaft 31 find lateral abutment in the bearings thereof in the clamping member 15 so that the operation of the cam moves the member 32 and the connection and the clamping member 10 upwardly and, due to the reaction of the shaft on the bearings thereof in the member 15, moves the member 15 downwardly compensatingly with the upward movement of the clamping member 10 so that the element A will be clamped onto the element B even if there are variations in the clamping structure or in its relation to either one or to both of the elements to be clamped together.

The joint in the connection permits of relative sidewise movement of parts thereof to adjust itself to disalinement which may exist or be made to exist in the mechanism.

The device shown and described has two clamping members and a cam operated connection between the same, each of the clamping members to contact one of the elements to be clamped together and each of the clamping members being individually movable to compensatingly accommodate themselves to the location of the elements and to move the elements for clamping together thereof. The connection being so constructed to permit individual movement of the clamping members while the same operates both of the clamping members either simultaneously or one after the other.

The present invention is illustrated in the drawing and is described in this specification as being applied to clamping a cylinder boring device onto a cylinder. Applicants are aware, however, that the present invention is applicable for clamping other elements together in which either one of the elements, or both of them, may be movable. Applicants are further aware that structural and functional changes can be made in the structure and function disclosed in this specification and that various mechanical equivalents can be introduced therein within the scope and intent of the present invention and the appended claim.

Therefore, applicants do not desire to limit the present invention to the precise application thereof as described in this application nor to the precise structure and arrangement and functioning of parts as disclosed in this application.

Having thus described the present invention, We claim:

A clamping member individually installable to engage an end of a cylinder, a clamping member individually installable to engage a cylinder boring device to be clamped onto the other end of said cylinder, a connection between said clamping members having threaded together parts for length adjustment thereof to adapt the clamping members for different lengths of cylinders, a connection automatically engaging said boring device upon installation of said device and automatically releasing therefrom upon removal of said device from said cylinder, a cam means to move said clamping members relatively for clamping said device onto said cylinder and releasing the same therefrom, said cam means including a part concentric with the axis of said cam means and being journaled in one part of said connection and a part eccentric with said axis being journaled in another part of said connection, said cam having a cam surface composed of an eccentric portion and a concentric portion, said concentric portion to release the cam for endwise removal thereof from the device and to release the clamping and said eccentric part to move said clamping members for clamping said device onto said cylinder and to release the same therefrom, and means for rotating said cam means to effect clamping and unclamping and releasing of said cam means.

JOHN Y. BLAZEK.
RUSSELL G. ANDERSON.